Feb. 18, 1969 D. R. HADDEN, JR 3,428,957

DATA STORAGE DEVICE USING SONIC WAVE PROPAGATION

Filed Jan. 27, 1965 Sheet 1 of 2

INVENTOR,
DAVID R. HADDEN JR.
BY Harry M. Saragovitz,
Edward J. Kelly, Herbert Berl
& Julian C. Keppler
ATTORNEYS INVENTOR,
DAVID R. HADDEN JR.
BY Harry M. Saragovitz
Edward J. Kelly, Herbert Berl
& Julian C. Keppler
ATTORNEYS

United States Patent Office 3,428,957

Patented Feb. 18, 1969

3,428,957

DATA STORAGE DEVICE USING SONIC WAVE PROPAGATION

David Rodney Hadden, Jr., Cold Spring Harbor, N.Y., assignor to the United States of America as represented by the Secretary of the Army Filed Jan. 27, 1965, Ser. No. 428,589

U.S. Cl. 340—174 5 Claims

Int. Cl. G11b *5/00*

ABSTRACT OF THE DISCLOSURE

A magnetic memory device including an anisotropic thin magnetic film having a circumferential easy axis is deposited on a tubular nonmagnetic substrate. A sonic transducer is mounted at one end of the substrate and an absorbing medium is mounted at the other end of the substrate. A conductor passes through the center of the tubular substrate with one end grounded and the other end connected to a current generator and a current detector. A coil is mounted coaxially with respect to the substrate, the film, and the conductor. The number of turns in the coil increases from the end adjacent the transducer to the end adjacent the absorber. The increase in strength of the steady magnetic field produced by the coil is proportional to the rate of dissipation of the sonic wave in the substrate.

The invention described herein may be manufactured and used by or for the Government for governmental purposes without the payment of any royalty thereon.

The present invention relates to high density data storage devices and more particularly to improvements in anisotropic magnetic memory devices which have the attribute of coincident current and strain selection.

In the field of data storage it has been the general practice to employ peripheral magnetic memory devices to store large quantities of digital information in a relatively small space. In such devices, digital information is recorded by either changing or not changing the direction of the remanent flux in small sections along the length of the anisotropic material. The direction is changed or reversed by the combined effect of a mechanical strain and a magnetic field. Information is recorded by applying current pulses to a conductor, which is inductively coupled to the magnetic material, while a strain pulse such as a sonic wave, travels from one end of the material to the other. Since sonic waves will dissipate as they travel along the material the device will normally be more sensitive at the proximal end than at the distal end. This difference in sensitivity becomes greater and more critical as the memory device is made longer or as the material becomes less elastic.

An object of the present invention is the provision of means for increasing the sensitivity of anisotropic materials to sonic waves.

Another object is the provision of means for simplifying and reducing the costs of anisotropic magnetic memory devices.

A further object of the invention is the provision of means for permitting an increase in the size of magnetic memories without degrading sensitivity.

Other objects and advantages of the invention will hereinafter become more fully apparent from the following description of the annexed drawings, which illustrate a preferred embodiment, and wherein.

Figure 1:
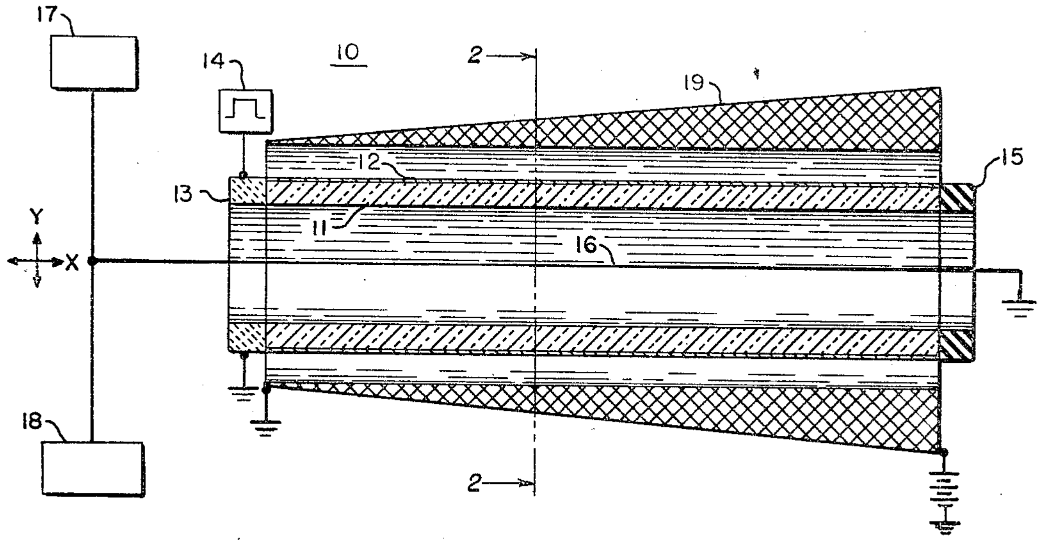
FIG. 1 shows a section of the device taken on the line 1—1 of FIG. 2.
Figure 2:
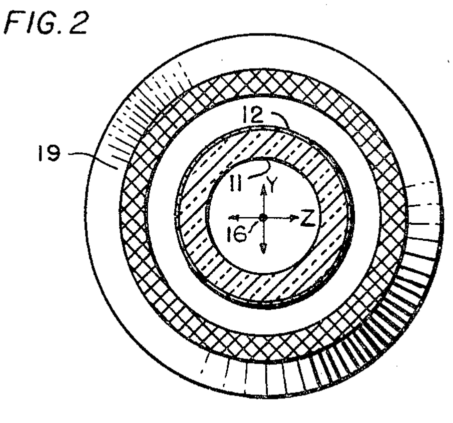
FIG. 2 shows a section of the device taken on the line 2—2 of FIG. 1.

Referring to the drawings, wherein like reference characters designate like or corresponding parts throughout the several views there is shown in FIGS. 1 and 2 a magnetic memory device 10 comprising a tubular nonmagnetic substrate 11 having an anisotropic thin magnetic film 12 deposited thereon. Substrate 11 may be of glass or quartz and film 12 may be any of the well known ferromagnetic materials. Film 12 may be deposited by any of the standard methods of evaporation, cathode disintegration, electroplating, etc. in the presence of a magnetic field to provide a circumferential easy axis in a plane perpendicular to the longitudinal or X axis of the system as seen in FIG. 1. Actually, the easy axis for any small elemental section of film 12 would be in the Y–Z plane and tangent to the circumference. The material will, therefore, be referred to as having a circumferential easy axis.

Mounted on one end of substrate 11 is a sonic transducer 13 which is excited by a pulse generator 14. At the opposite end of substrate 11 there is mounted an absorbing medium 15. Transducer 13 is shown schematically and may be a piezoelectric crystal device or any other well known sonic transducer. Absorbing medium 15 may be made of rubber. Other methods of terminating the device to avoid reflections of the sonic wave are also possible such as tapering the end of substrate 11.

A conductor 16 passes through the center of tubular substrate 11. One end of conductor 16 is grounded and the other end is connected to a current generator 17 and a current detector 18.

A coil 19 is mounted coaxially with respect to substrate 11, film 12, and conductor 16. The number of turns of the coil increases from the end adjacent to transducer 13 to the end adjacent termination 15. The linear change in thickness is shown in FIG. 1 only as a matter of convenience. In general, the increase in strength of the steady magnetic field produced by coil 19 should be inversely proportional to the rate of dissipation of the sonic wave in substrate 11. In most cases this change will be linear.

Figure 3:
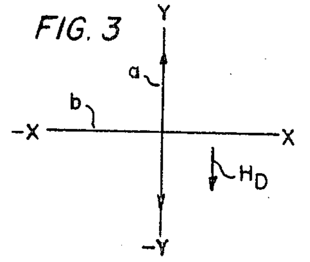
FIGS. 3–6 show the orientation of the easy and hard axis of the material under varying conditions.
Figure 7:
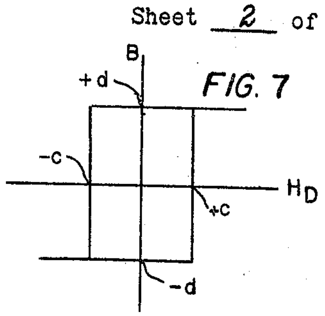
FIGS. 7–10 show simplified hysteresis curves for the material under the conditions outlined for FIGS. 3–6, respectively.

The operation of the device will now be described with reference to FIGS. 3–10. FIGS. 3 and 7 show the original state of the magnetic material 12 as it is deposited on the substrate 11. The easy axis *a* is coincident with the Y axis and is represented by the arrows. The hard axis *b* will be directed along the X axis. Of course, the diagrams represent the easy axis and magnetic moments for an elemental section of film 12 located on the Z axis in FIGS. 1 and 2. FIGS. 3–10 would have the same general shape with only a change in designation of the Y axis for all elemental sections. For example, for an elemental section located on the Y axis of FIGS. 1 and 2, the easy axis *a* in FIG. 3 would be directed along the Z axis rather than the Y axis as shown. All other elemental sections would have an easy axis *a* somewhere in the Y–Z plane, and at some angle between the Y and Z axes.

The drive field produced by conductor 16 is shown by arrow $H_D$ and is applied along the easy axis *a*. The initial hysteresis curve for the material is shown in FIG. 7 where $H_D$ is the drive field produced by conductor 16 and B is the remanent flux in material 12. With no drive field $H_D$ applied, the film 12 will have a remanent flux B equal to the value represented by $+d$ or $-d$. The value of the drive field $H_D$ should be at least smaller than $+c$ and larger than $-c$ so that the remanent flux will not switch or rotate under the influence of the drive field $H_D$ alone. Of course, the hysteresis loop shown in FIG. 7 is simplified and the actual shape will depend on the magnetic material used.

Figure 4:
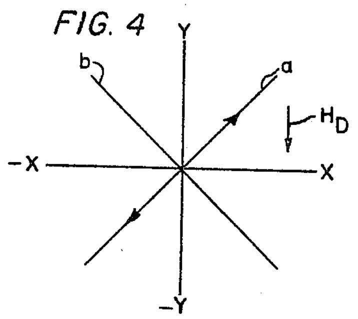
Figure 8:
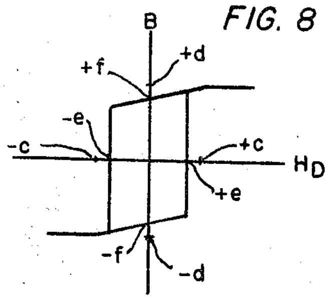

FIG. 4 represents the orientation of the easy axis *a* and the hard axis *b* when the material is subjected to a mechanical strain substantially along the X axis. The individual crystals will be subjected to a mechanical deformation and the magnetic moments will be rotated through an angle. The hysteresis loop will be reduced, as seen in FIG. 8, since the projection on the Y axis of the remanant flux B is less and the drive field $H_D$ required to effect rotation is less. The amount of drive field $H_D$ required to rotate the magnetic flux will, of course, depend on the amount of applied strain. The larger the amount of applied strain, the larger will be the angle between the easy axis *a* and the Y axis. Therefore, basically, the drive field should assume a value less than $+c$ and greater than $+e$ or greater than $-c$ and less than $-e$ to effect rotation of flux B in that small section of film 12 which is under strain.

In the device of FIGS. 1 and 2, the strain is produced in the film 12 by the transducer 13 which applies a sonic wave to substrate 11. As the sonic wave travels along the substrate 11, the conductor 16 may be pulsed (or not pulsed) by generator 17 to provide the drive field necessary to rotate or not rotate the remanent flux. The value of the drive field $H_D$ must be less than $+c$ to prevent rotation of the remanent flux over the entire length of film 12 and must be greater than $+e$ to effect rotation of the flux in that small peripheral section of film 12 where the sonic wave is located at the time the conductor 16 is pulsed. In this way numerous small domains of remanent flux substantially equal to the length of the sonic wave and oriented in either of two directions are produced along film 12.

As the sonic wave travels along the substrate 11, it will be attenuated to some degree, the amount of strain will get less, and the resulting loop (FIG. 8) for the section under strain will become larger and approach the loop shown in FIG. 7. Therefore, the value $+e$ will approach $+c$ as the sonic wave is dissipated and the tolerance for the drive field $H_D$ will be more critical and the device less sensitive for those sections near the distal or terminating end of material 12.

Figure 5:
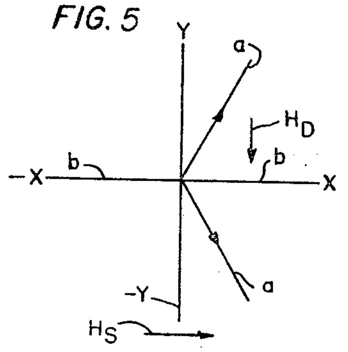
Figure 9:
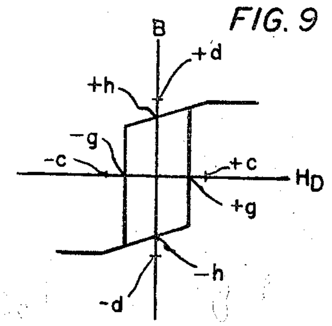

The hysteresis curve, however, can be kept to a constant size over the entire length of the film 12 by applying a steady magnetic field $H_S$ with coil 19 in the direction of the X axis. The effect of the steady magnetic field $H_S$ is to bend the easy axis *a* in the direction of the field $H_S$ as shown in FIG. 5. The effect on the hysteresis loop is substantially the same as if a strain were applied to the film 12, i.e., the loop will be smaller as shown in FIG. 9. The amount of bending of the easy axis *a* and the resultant reduction in size of the hysteresis loop will depend on the strength of the field $H_S$.

Figure 6:
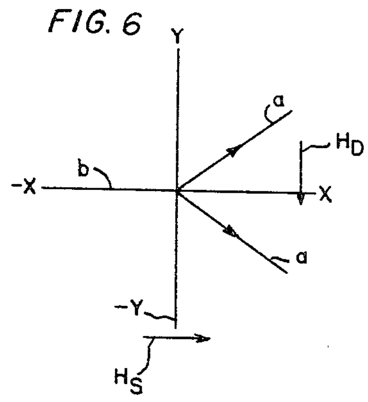
Figure 10:
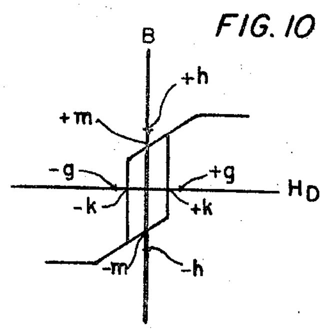

If the strength of field $H_S$ varies over the length of film 12 in an inverse manner with respect to the attenuation of the sonic wave, all sections along the film 12 will show a constant hysteresis loop when under strain. This is true because the effect of a strain on the easy axis *a* of the film 12 which is biased by the field $H_S$ is to bend the easy axis *a* even further and therefore reduce further the size of the hysteresis loop as is shown in FIGS. 6 and 10. Since the strength of field $H_S$ is less at the end closest to the transducer 13 where the sonic wave is greatest, the hysteresis loop of FIG. 10 will be substantially the same size as at the opposite end where the field $H_S$ is largest and the sonic wave is weakest. The loop shown in FIG. 9, however, will be largest at the end adjacent the transducer 13 and will be smaller at the other end where the field $H_S$ is larger. Therefore, the value $+g$ will be equal to $+c$ at the end adjacent transducer 13 and will approach the value $+k$ as the size of $H_S$ increases along the length of the material. The difference between $+g$ and $+k$ at any location on the material, however, will be larger than the difference between $+c$ and $+e$ at the same location because the difference between $+g$ and $+k$ is determined by the cumulative effect of both the stress and the field $H_S$ at that location.

To summarize, digital information may be recorded onto film 12 by first applying a direct current to coil 19, then energizing generator 14 to produce a single sonic wave in substrate 11, and finally pulsing conductor 16 with generator 17 while the sonic wave travels along substrate 11. The current pulses applied, which will represent the digital information, will switch or rotate the remanent flux in small sections or domains along film 12.

A nondestructive read out may be accomplished by simply energizing transducer 13 and detecting current pulses induced in conductor 16 as the sonic wave passes from one domain to the other. For example, assume that the current is removed from coil 19 and we have the condition shown in FIG. 7. The film 12 is assumed, in accordance with the stored information, broken up into a plurality of domains of remanent flux the values of each domain being equal to either $+d$ or $-d$. We may first analyze the wave when it is located entirely in a domain the value of which is equal to $+d$. Now, the leading edge of the sonic wave will be changing the remanent flux from a value of $+d$ to $+f$ as can be seen from FIGS. 7 and 8. The trailing edge of the sonic wave will be changing the remanent flux from a value of $+f$ to $+d$. Since these changes are equal in value but opposite in direction they will cancel each other out and no current will be induced in conductor 16. We may now analyze the change in remanent flux for the case when the sonic wave spans two domains, i.e., the leading edge of the wave is in one domain, the value of which is equal to $+d$, for example, while the trailing edge is in the adjacent domain having a value equal to $-d$. The leading edge will be producing a change in remanent flux from $+d$ to $+f$ while the trailing edge will be producing a change from $-f$ to $-d$. In this case the two changes are equal in value but are now in the same direction. Since these changes in flux are additive, a current will be induced in conductor 16. Therefore, whenever a sonic wave passes between adjacent sections having opposite directions of remanent flux a current is induced in conductor 16 which can be detected by detector 18.

The above analysis assumed that there was no current in coil 19 and, therefore, no steady field $H_S$. However, read out may also be accomplished while field $H_S$ is present and the above analysis may be carried out with FIGS. 9 and 10 substantially in the same manner as was done for FIGS. 7 and 8.

It is to be understood that many variations are possible. There are many other means for producing a variable strength steady magnetic field $H_S$ other than varying the number of turns. Substrate 11 may be flat rather than tubular and film 12 may have something other than a circumferential easy axis.

It should be understood, of course, that the foregoing disclosure relates to only a preferred embodiment of the invention and that numerous modifications or alterations may be made therein without departing from the spirit and scope of the invention as set forth in the appended claims.

What is claimed is:

1. A magnetic memory device comprising; an elongated member of magnetic material having a relatively high anisotropy and having an easy axis which initially lies in a plane substantially perpendicular to the longitudinal axis of said member, means for exciting a sonic wave in said member, magnetic means for applying to said member a steady magnetic field parallel to said longitudinal axis and including means for varying the strength of said steady magnetic field along the lentgh of said member, and means for applying to the entire length of said material a pulsed magnetic field in a plane perpendicular to said longitudinal axis.

2. The device according to claim 1 and wherein said means for varying said steady magnetic field includes means for making said field stronger as said field becomes more remote from said means for exciting a sonic pulse.

3. The device according to claim 1 and wherein said means for varying said steady magnetic field includes means for increasing the strength of said steady magnetic field inversely with respect to the dissipation of said sonic wave along the lentgh of said member.

4. A magnetic memory device comprising; an elongated substrate of elastic material, means at one end of said substrate for exciting a sonic wave therein, means at the other end of said substrate for preventing reflections of said sonic wave, an anisotropic thin magnetic film deposited on said substrate, said film having a circumferential easy axis directed transverse with respect to the longitudinal axis of said substrate, a coil surrounding said thin film, the number of turns per unit of longitudinal length of said coil increasing from said one end to said other end, means for applying a direct current to said coil, and means extending the entire length of said film for selectively applying or detecting a pulsed magnetic field in a plane transverse to the longitudinal axis of said substrate.

5. The device according to claim 4 and wherein said increase in said turns is inversely proportional to the rate at which said substrate dissipates a sonic pulse.

References Cited

UNITED STATES PATENTS

| | | | |
|---|---|---|---|
| 3,145,372 | 8/1964 | Suits et al. | 340—174 |
| 3,151,316 | 9/1964 | Bobeck | 340—174 |
| 3,207,976 | 9/1965 | Stimler | 307—88 XR |

TERRELL W. FEARS, *Primary Examiner.*

G. M. HOFFMAN, *Assistant Examiner.*